United States Patent
He et al.

(10) Patent No.: US 7,937,996 B2
(45) Date of Patent: May 10, 2011

(54) TURBO SPEED SENSOR DIAGNOSTIC FOR TURBOCHARGED ENGINES

(75) Inventors: Chuan He, Northville, MI (US); Yun Xiao, Ann Arbor, MI (US)

(73) Assignee: GM Global Technology Operations LLC

( * ) Notice: Subject to any disclaimer, the term of this patent is extended or adjusted under 35 U.S.C. 154(b) by 279 days.

(21) Appl. No.: 12/141,329

(22) Filed: Jun. 18, 2008
(Under 37 CFR 1.47)

(65) Prior Publication Data
US 2009/0055072 A1     Feb. 26, 2009

Related U.S. Application Data

(60) Provisional application No. 60/957,820, filed on Aug. 24, 2007.

(51) Int. Cl.
*G01M 15/00*     (2006.01)
(52) U.S. Cl. .................................................. 73/114.77
(58) Field of Classification Search .............. 73/114.77
See application file for complete search history.

(56) References Cited

U.S. PATENT DOCUMENTS

| | | | |
|---|---|---|---|
| 6,119,473 A * | 9/2000 | Kishita et al. ............. 62/228.4 |
| 6,134,890 A * | 10/2000 | Church et al. .................. 60/602 |
| 6,233,934 B1 * | 5/2001 | Church et al. .................. 60/602 |
| 6,298,718 B1 * | 10/2001 | Wang ......................... 73/114.01 |
| 6,681,573 B2 * | 1/2004 | Arnold ............................ 60/602 |
| 6,785,604 B2 * | 8/2004 | Jacobson ....................... 701/114 |
| 6,804,601 B2 * | 10/2004 | Wang et al. ................... 701/107 |
| 7,089,738 B1 * | 8/2006 | Boewe et al. ................ 60/605.2 |
| 7,127,892 B2 * | 10/2006 | Akins et al. .................... 60/600 |
| 7,380,445 B2 * | 6/2008 | Wood ......................... 73/114.39 |
| 7,469,577 B2 * | 12/2008 | Barton ........................ 73/114.77 |
| 7,484,367 B2 * | 2/2009 | Kishimoto et al. ............. 60/602 |
| 2008/0053087 A1 * | 3/2008 | Swenson et al. ................ 60/599 |
| 2009/0024295 A1 * | 1/2009 | Swenson et al. .............. 701/100 |

FOREIGN PATENT DOCUMENTS

| CN | 1363790 A | 8/2002 |
|---|---|---|
| JP | 2005330811 A | 12/2005 |

* cited by examiner

*Primary Examiner* — Freddie Kirkland, III

(57) ABSTRACT

A method of diagnosing operation of a turbo speed sensor that monitors a turbocharger in an internal combustion engine system includes determining whether the engine system is operating in one of a high speed and a low speed range and determining a threshold turbo speed value based on whether engine system is operating in one of the high speed and the low speed range. An actual turbo speed value of the turbocharger is monitored based on a signal generated by the turbo speed sensor. The actual turbo speed value is compared to the threshold turbo speed value and a diagnostic signal is generated based on the step of comparing.

27 Claims, 5 Drawing Sheets

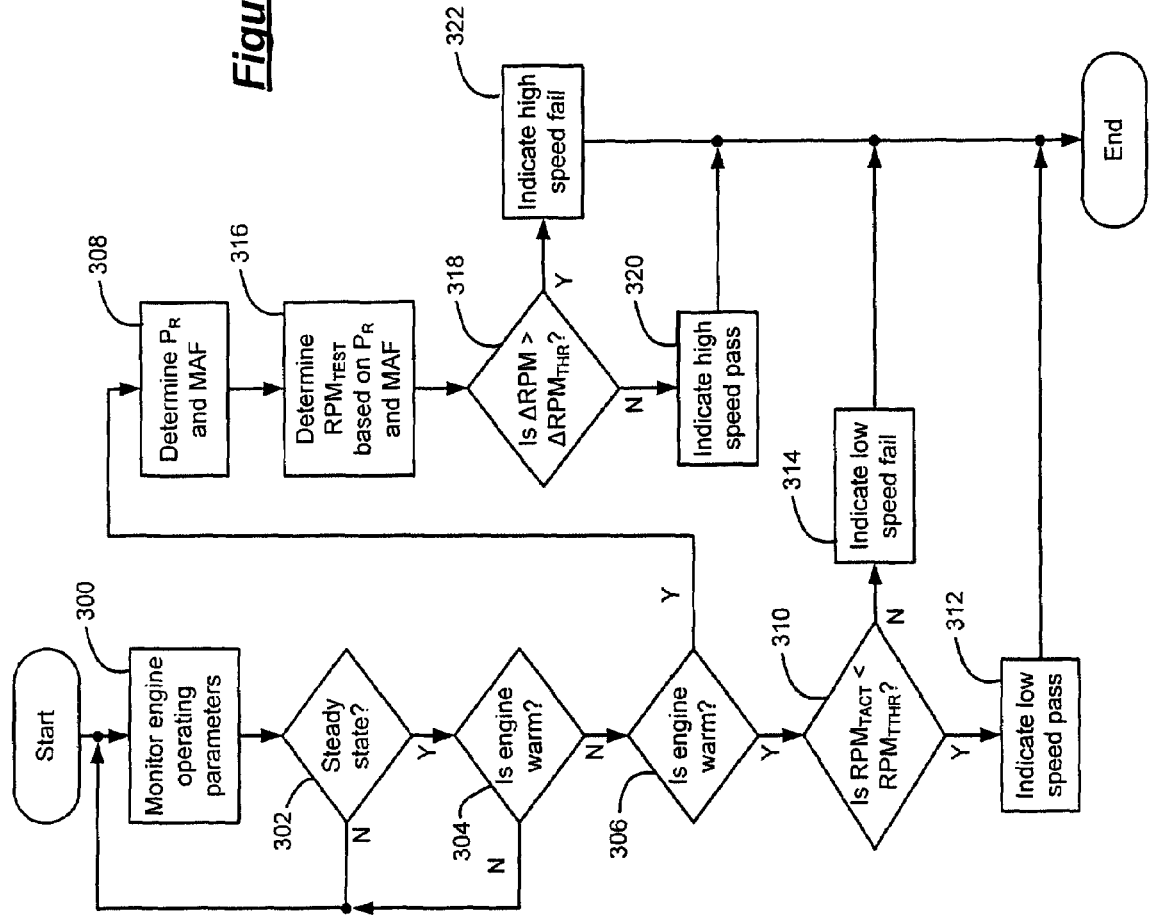

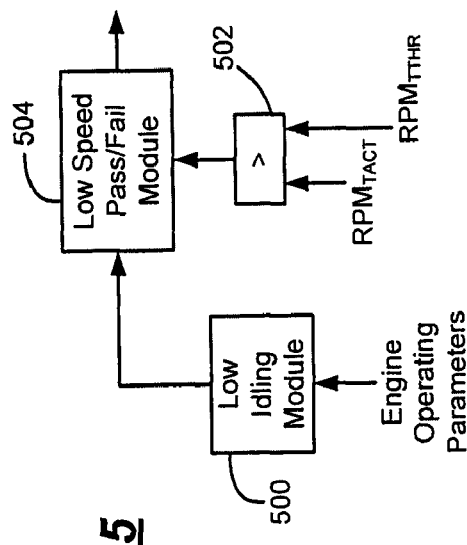

TURBO SPEED SENSOR DIAGNOSTIC FOR TURBOCHARGED ENGINES

CROSS-REFERENCE TO RELATED APPLICATIONS

This application claims the benefit of U.S. Provisional Application No. 60/957,820, filed on Aug. 24, 2007. The disclosure of the above application is incorporated herein by reference

FIELD

The present disclosure relates to internal combustion engines, and more particularly to a turbo speed sensor diagnostic for a turbocharged engine.

BACKGROUND

Internal combustions engines combust an air and fuel (A/F) mixture within cylinders to produce drive torque. More specifically, the combustion events reciprocally drive pistons that drive a crankshaft to provide torque output from the engine. The A/F mixture is ignited or sparked at a desired crank angle. Some internal combustion engines include a turbocharger, which increases the charge air density ingested by the engine. The turbocharger is driven by the exhaust gas, whereby the heat energy of the exhaust gas is transformed into mechanical energy to compress the air entering the engine.

Engine manufacturers seek to consistently improve the emissions output and control of internal combustion engines. To this end, a plurality of sensors is commonly employed to monitor various engine operating parameters. In the case where a turbocharger is implemented, various sensors that monitor the operating parameters of the turbocharger, such as a turbocharger speed sensor, may also be included. Sensor diagnostics are typically included to determine whether the various sensors, which monitor the engine operating parameters, are accurately monitoring the respective engine operating parameter. Traditional sensor diagnostic systems, however, require intensive initial calibration effort and additional hardware, both of which increase the cost and time required to develop and manufacture an engine system. Additionally, traditional sensor diagnostic systems do not determine whether a sensor is providing accurate readings across its entire operating range.

SUMMARY

Accordingly, the present disclosure provides a method of diagnosing operation of a turbo speed sensor that monitors a turbocharger in an internal combustion engine system. The method includes determining whether the engine system is operating in one of a high speed and a low speed range and determining a threshold turbo speed value based on whether engine system is operating in one of the high speed and the low speed range. An actual turbo speed value of the turbocharger is monitored based on a signal generated by the turbo speed sensor. The actual turbo speed value is compared to the threshold turbo speed value and a diagnostic signal is generated based on the step of comparing.

In another feature, the method further includes determining whether the engine system is operating in a steady state condition. The steps of comparing and generating are executed only if the engine system is operating in the steady state condition.

In other features, the step of comparing includes determining whether the actual turbo speed value is less than the threshold turbo speed. The diagnostic signal is a pass signal if the actual turbo speed value is less than the threshold turbo speed value and the diagnostic signal is a fail signal if the actual turbo speed value is not less than the threshold turbo speed value. Optionally, the step of comparing is executed only if an engine temperature is greater than a threshold engine temperature.

In still other features, the method further includes determining an estimated turbo speed value based on a pressure ratio and a mass air flow through the turbocharger. The threshold turbo speed value is based on the estimated turbo speed value. Optionally, the step of determining an estimated turbo speed value includes implementing a compressor map that is specific to the turbocharger.

In yet other features, the method further includes determining a second threshold turbo speed value and defining a diagnostic turbo speed range between the threshold turbo speed value and the second threshold turbo speed value. The step of comparing includes determining whether the actual turbo speed value is within the diagnostic turbo speed range. Optionally, the diagnostic signal is a pass signal if the actual turbo speed value is within the diagnostic turbo speed range and the diagnostic signal is a fail signal if the actual turbo speed value is not within the diagnostic turbo speed range.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a flowchart illustrating exemplary steps executed by the turbo speed sensor diagnostic control of the present disclosure;

FIG. 4 is a functional block diagram illustrating exemplary upper level modules that execute the turbo speed sensor diagnostic control;

FIG. 5 is a functional block diagram illustrating exemplary lower level modules that execute a low speed diagnostic portion of the turbo speed sensor diagnostic control.

DETAILED DESCRIPTION

Figure 1:
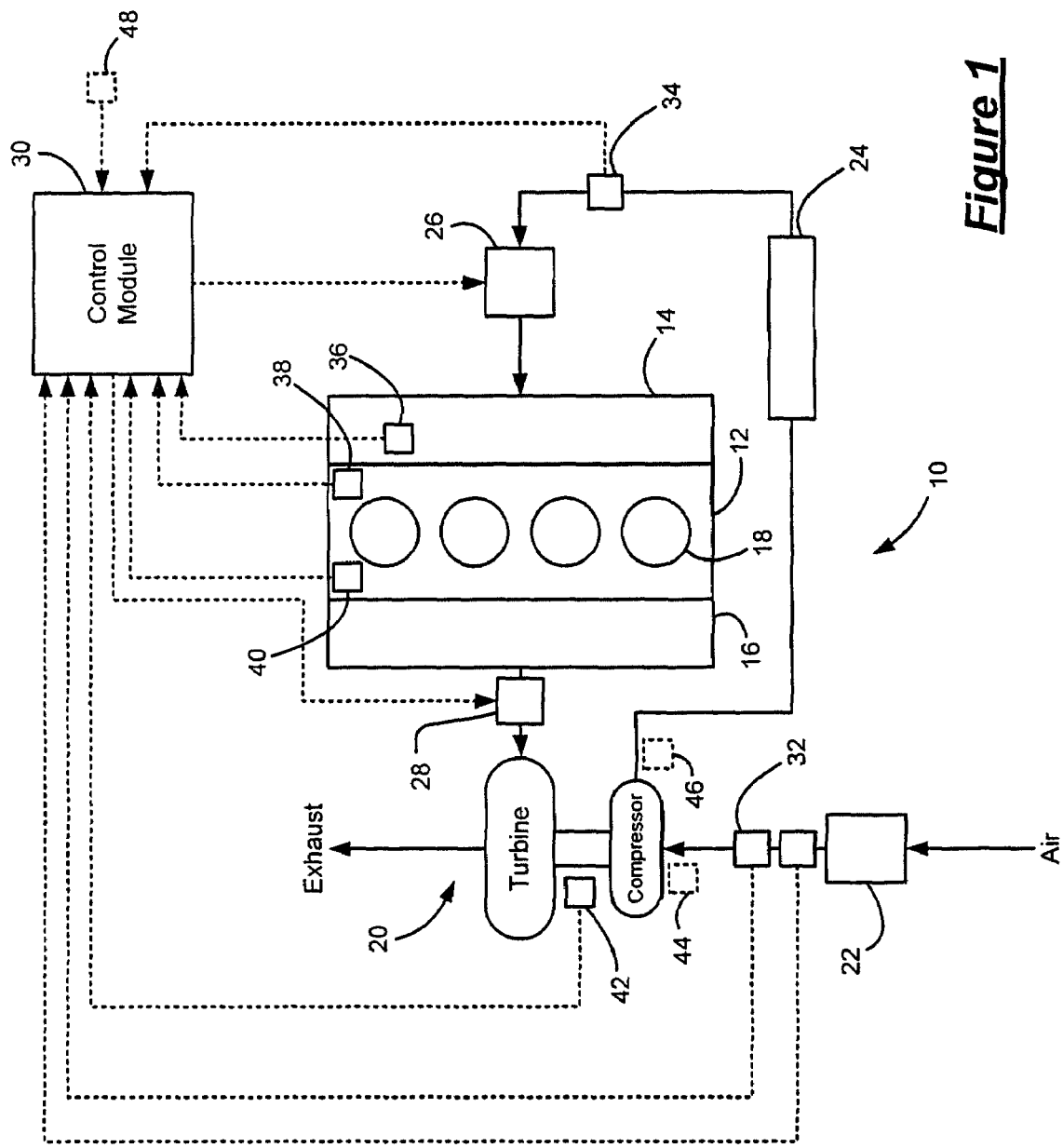
FIG. 1 is a functional block diagram of an engine system including a turbo charger.

The following description is merely exemplary in nature and is in no way intended to limit the disclosure, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system 10 is illustrated. The engine system 10 includes an engine 12 having an intake manifold 14 and an exhaust manifold 16. Air and fuel are mixed and the air/fuel mixture is combusted within cylinders 18 of the engine 12. Although the exemplary engine illustrated in FIG. 1 includes 4 cylinders, it is anticipated that the engine can include more or fewer cylinders. For example, engines having 2, 3, 5, 6, 8, 10 and 12 cylinders are anticipated.

The engine system 10 further includes a turbocharger 20. Exhaust gas exiting the exhaust manifold drives the turbocharger 20, which compresses air that is drawn into the engine from atmosphere through an air filter 22 and an air cooler 24. The compressed air is metered into the intake manifold 14 through a throttle 26.

The turbocharger 20 can further include a variable nozzle 28 that is controlled by engine control module to vary the exhaust gas flow angle and velocity into the turbocharger 20. More specifically, the exhaust gas energy conversion or utilization in the turbocharger can be controlled such that the amount of boost provided by the turbocharger 20 can be regulated. Alternately, the turbocharger 20 may include a waste gate that is actuated to detour the exhaust gas exiting the exhaust manifold 16. More specifically, the exhaust gas can be selectively detoured such that it does not drive the turbocharger 20. In this manner, the amount of boost provided by the turbocharger 20 can be regulated.

A control module 30 regulates operation of the engine system 10. More specifically, the control module 30 regulates operation of the throttle 26 and the variable nozzle 28 of the turbocharger 20 based on a plurality of engine operating parameters. A mass air flow (MAF) sensor 32 generates a MAF signal based on the air flow into the engine system 10 and an intake air temperature sensor 50 generates a signal based on the temperature of the intake air ($T_{IA}$).

A manifold absolute pressure (MAP) sensor 36 generates a MAP signal, an intake manifold temperature (IMT) sensor 34 generates a IMT signal, and an engine temperature sensor 38 generates a signal based on an engine temperature ($T_{ENG}$). $T_{ENG}$ can be based on, for example the temperature of a coolant flow and/or oil flow through the engine system 10. An engine speed sensor 40 generates an $RPM_{ENG}$ signal based on the rotational speed of a crankshaft (not shown). Alternatively, MAF can be estimated using the speed density method, which estimates MAF based on engine operating parameters including, but not limited to, $RPM_{ENG}$, an exhaust gas recirculation (EGR) rate (i.e., in the case that an EGR system is implemented), intake manifold temperature (IMT), intake manifold pressure (MAP), and engine displacement.

A turbo speed sensor 42 generates a turbo speed signal, upon which an actual turbo speed ($RPM_{TACT}$) is determined. It is also anticipated that inlet and outlet pressure sensors 44, 46 (shown in phantom), respectively, can optionally be provided to monitor turbo inlet and outlet pressures $P_{IN}$, $P_{OUT}$, respectively. A barometer pressure sensor 48 is also included and is responsive to a barometer pressure ($P_{BARO}$).

The turbo speed sensor diagnostic control of the present disclosure includes both low and high speed diagnostics. The low speed diagnostic portion will be initially discussed in detail. When the engine system is idling at steady state, the exhaust flow and exhaust temperature are low. As a result, the turbine portion of the turbocharger 20 gets limited exhaust energy and its speed is very low. By monitoring $RPM_{ENG}$, throttle position, boost pressure, how long the engine system 10 is idling and other engine parameters, the turbo speed sensor diagnostic control can determine whether the engine system 10 is operating under a low idling condition.

The turbo speed sensor diagnostic control can also determine whether $T_{ENG}$ is sufficiently warm (e.g., by comparing $T_{ENG}$ to a threshold value) to provide an accurate diagnostic result. If the engine system 10 is operating in the low idling condition and is sufficiently warm, $RPM_{TACT}$ is compared to a turbo speed threshold ($RPM_{TTHR}$). If $RPM_{TACT}$ is less than $RPM_{TTHR}$, the turbo speed sensor is deemed to be accurate in for the low speed diagnostic. If $RPM_{TACT}$ is not less than $RPM_{TTHR}$, the turbo speed sensor is deemed to be inaccurate for the low speed diagnostic. The low speed diagnostic can be executed a number of times, for example, whereby if the number of failures exceeds a threshold number of failures, a fault flag is set indicating that the turbo speed sensor is inaccurate in the low speed range. Alternatively or additional thereto, a timer can be implemented, wherein a fault flag is set if a threshold number of failures occur within a predetermined time period.

Figure 2:
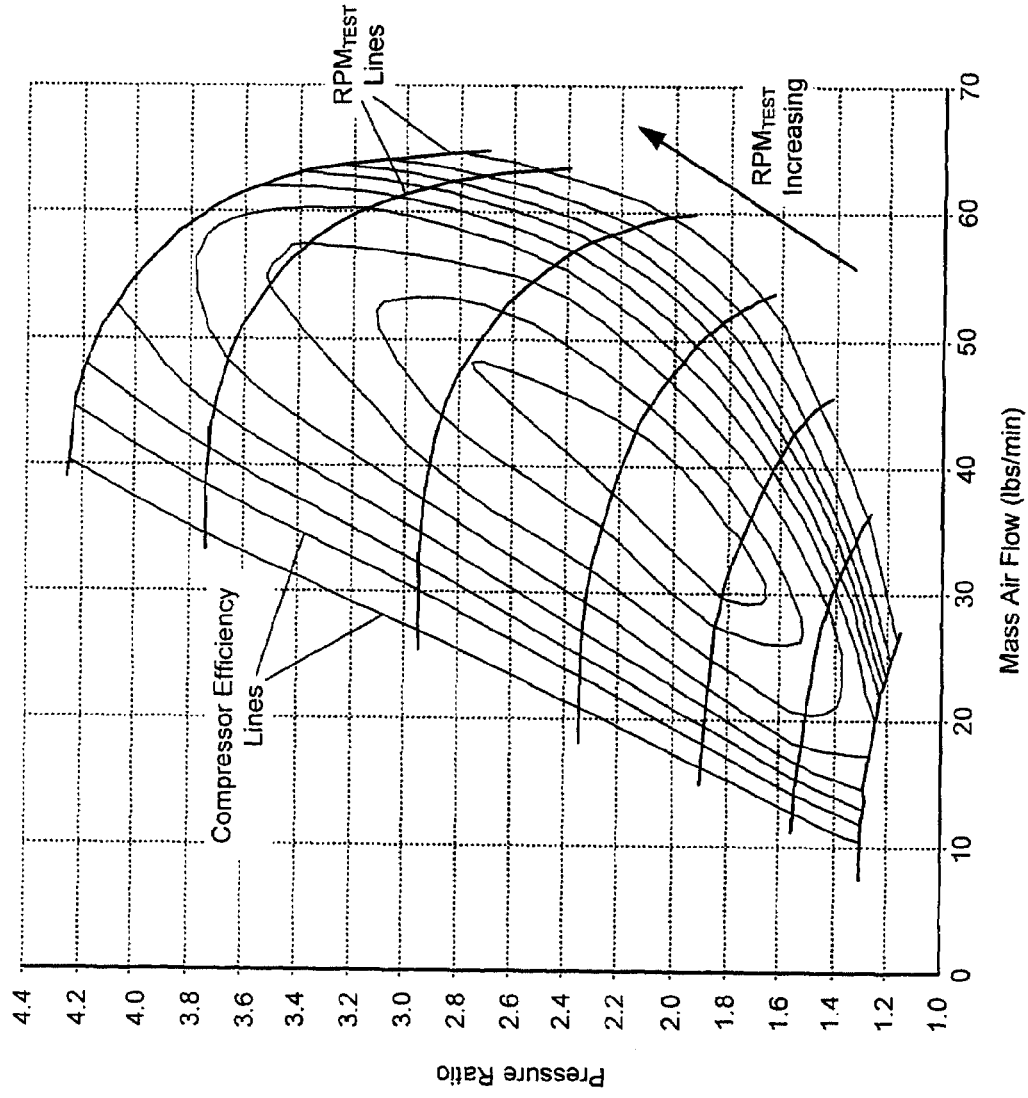
FIG. 2 illustrates an exemplary compressor map for an exemplary turbocharger.

For the high speed diagnostic portion, a warmed up engine at high load and/or high speed provides sufficient exhaust energy to the turbocharger 20 to drive the turbocharger 20 at a high speed. The turbo speed sensor diagnostic control can also determine whether $T_{ENG}$ is sufficiently warm, same as in the above for the low speed diagnostics by comparing $T_{ENG}$ to a threshold value, to provide an accurate high speed diagnostic result. The turbo speed sensor diagnostic control implements a compressor map to provide an estimated turbo speed $RPM_{TEST}$ for the specific operating conditions. An exemplary compressor map, which maps $RPM_{TEST}$ based on pressure ratio ($P_R$), MAF and compressor operating efficiency, is illustrated in FIG. 2. At steady state, the $RPM_T$ is a function of $P_R$, which is based on the compressor inlet pressure ($P_{IN}$) and the compressor outlet pressure ($P_{OUT}$), and the MAF through the turbocharger 20. $P_{IN}$ and $P_{OUT}$ can be measured by the optional inlet and outlet pressure sensors 44, 46, respectively. It is also anticipated that $P_{IN}$ can be estimated based on the MAF and the $P_{BARO}$, and $P_{OUT}$ can be estimated based on the MAF and the MAP, and other factors including, but not limited to, the intake air filter pressure loss and the charge air cooler loss, which may be a function of MAF and a flow resistance of the air filter 22 and the charge air cooler 24. The turbo speed sensor diagnostic control can also determine whether the engine system 10 is operating in a steady state condition based on engine operating parameters including, but not limited to, an $RPM_{ENG}$ change rate and history thereof, as well as a fueling change rate and history thereof.

Using the compressor map, a range of turbo speeds for a given $P_R$ and MAF is estimated. The actual turbo speed will vary to some degree due to the production engine to engine turbocharger system efficiency variability. For example, the $RPM_{TACT}$ is higher when the turbocharger is operating more efficiently and is lower when the turbocharger is operating less efficiently. A safety margin can be added to form the upper and lower turbo speed threshold values, which define a high speed diagnostic range for the turbo speed sensor. If $RPM_{TACT}$ is within the high speed diagnostic range, the turbo speed sensor is deemed to be accurate for the high speed diagnostic. $RPM_{TACT}$ is not within the high speed diagnostic range, the turbo speed sensor is deemed to be inaccurate for the high speed diagnostic. Again, as described above with regard to the low speed diagnostic, a counter and/or timer may be used to make the fault set more robust to noise and false faults.

As an alternative, a single estimated $RPM_T$ value ($RPM_{TEST}$) can be provided by the compressor map. A speed difference ($\Delta RPM$) is determined based on $RPM_{TEST}$ and $RPM_{TACT}$. $\Delta RPM$ is compared to a threshold $\Delta RPM$ ($\Delta RPM_{THR}$). If $\Delta RPM$ is less than $\Delta RPM_{THR}$, the turbo speed sensor is deemed to be accurate for the high speed diagnostic. If $\Delta RPM$ is not less than $\Delta RPM_{THR}$, the turbo speed sensor is deemed to be inaccurate for the high speed diagnostic. Again, a counter and/or timer can also be implemented with this embodiment.

Referring now to FIG. 3, exemplary steps that are executed by the turbo speed sensor diagnostic control will be described in detail. In step 300, control monitors the engine operating parameters. In step 302, control determines whether the engine is operating at steady state, as described in detail above. If the engine is not operating in steady state, control loops back to step 300.

In step 304, control determines whether the engine is sufficiently warm, as described in detail above. If the engine is not sufficiently warm, control loops back to step 300. If the engine is operating in steady state and engine is sufficiently warm, control determines whether the turbocharger is operating at high speed in step 306. If the turbocharger is not operating at high speed, control continues in step 310. If the turbocharger is operating at high speed, control continues in step 308.

In step 310, control determines whether $RPM_{TACT}$, as determined based on the turbo speed sensor signal, is less than $RPM_{TTHR}$. If $RPM_{TACT}$ is less than $RPM_{TTHR}$, control indicates a low speed pass in step 312 and control ends. If $RPM_{TACT}$ is not less than $RPM_{TTHR}$, control indicates a low speed fail in step 314 and control ends. It is anticipated that a number of pass or a number fail indications can be accumulated and compared to a total number of pass and fail indications, in order to determine whether the turbo speed sensor is accurate in the low speed range.

In step 308, control determines $P_R$ and MAF. In step 316, control determines $RPM_{TEST}$ using the compressor map based on $P_R$ and MAF. Control determines whether $\Delta RPM$ is greater than $\Delta RPM_{THR}$ in step 318. If $\Delta RPM$ is not greater than $\Delta RPM_{THR}$, control indicates a high speed pass in step 320 and control ends. If $\Delta RPM$ is greater than $\Delta RPM_{THR}$, control indicates a high speed fail in step 322 and control ends. Again, it is anticipated that a number of pass or a number fail indications can be accumulated and compared to a total number of pass and fail indications, in order to determine whether the turbo speed sensor is accurate in the high speed range.

Referring now to FIG. 4, exemplary upper level modules that execute the turbo speed sensor diagnostic control will be described in detail. The exemplary modules include a steady state module 400 and a diagnostic routine module 402. The steady state module 400 monitors the engine operating parameters, determines whether the engine system is operating in steady state and outputs a corresponding signal to the diagnostic routine module 402. The diagnostic routine module 402 monitors the engine operating parameters and executes both the low and high speed diagnostic portions as described herein. The diagnostic routine module 402 outputs diagnostic signals indicating whether the turbo speed sensor is accurate for both the low and high speed ranges. The diagnostic signals can include, but are not limited to, a low speed pass signal, a high speed pass signal, a low speed fail signal and/or a high speed fail signal.

Referring now to FIG. 5, exemplary modules that execute the low speed diagnostic portion will be described in detail. The exemplary modules include a low idling condition module 500, a comparator module 502 and a low speed pass/fail module 504. The low speed idling module 500 monitors the engine operating parameters, determines whether the engine is operating in a low idling condition, as described herein, and outputs a corresponding signal to the low speed pass/fail module 504. The comparator module 502 determines whether $RPM_{TACT}$ is greater than $RPM_{TTHR}$ and outputs a corresponding signal to the low speed pass/fail module. The low speed pass/fail module 504 generates a diagnostic signal based on the signals from the low idling condition module 500 and the comparator module 502.

Figure 6:
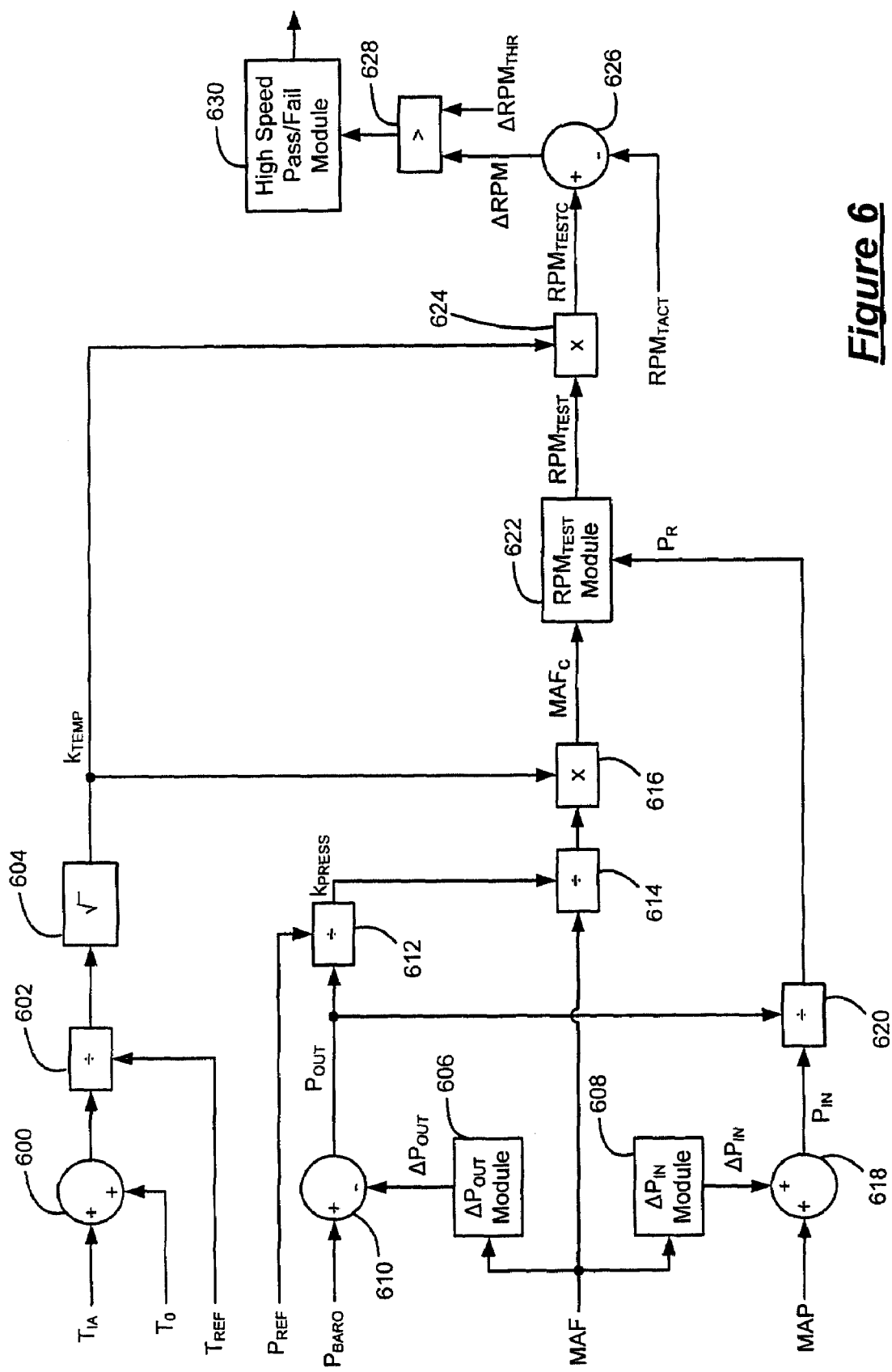
FIG. 6 is a functional block diagram illustrating exemplary lower level modules that execute a high speed diagnostic portion of the turbo speed sensor diagnostic control.

Referring now to FIG. 6, exemplary modules that execute the high speed diagnostic portion will be described in detail. Since the compressor's speed, pressure ratio, flow, and efficiency relations are mapped out under one barometric and temperature test condition, these relations are would only be valid for that particular test condition. A compressor map is constructed referencing to standard reference temperature ($T_{REF}$) and pressure ($P_{REF}$) condition, so it could be used for other hot or cold ambient and high altitude conditions if we use the scaled or corrected pressure and temperature parameters for the map. A summer module 600 converts $T_{IA}$ in Celsius temperature scale into the absolute thermodynamic temperature scale in Kelvin. This sum is scaled by a reference temperature ($T_{REF}$), by which the compressor map is constructed and referenced to, at a divider module 602. A square root of this quotient is determined at a square root module 604 to provide a temperature correction factor ($k_{TEMP}$). This temperature correction factor ($k_{TEMP}$) is used for both MAF input correction and turbo speed estimation output ($RPM_{TEST}$) correction. An outlet pressure differential ($\Delta P_{OUT}$) module 606 determines $\Delta P_{OUT}$ based on MAF. Similarly, an inlet pressure differential ($\Delta P_{IN}$) module 608 determines $\Delta P_{IN}$ based on MAF. $\Delta P_{OUT}$ is provided to a difference module 610, which determines $P_{OUT}$ as the difference between $P_{BARO}$ and $\Delta P_{OUT}$. $P_{OUT}$ is scaled by a reference pressure ($P_{REF}$), by which the compressor map is constructed and referenced to, at a divider module 613 to provide a pressure correction factor ($k_{PRESS}$). MAF is corrected based on $k_{PRESS}$ and $k_{TEMP}$ at respective divider and multiplier modules 614, 616, respectively, to provide a corrected $MAF_c$.

$\Delta P_{IN}$ is provided to a summer module 618, which determines $P_{IN}$ as the sum of MAP and $\Delta P_{IN}$. A divider module 620 determines $P_R$ based on $P_{OUT}$ and $P_{IN}$. $MAF_c$ and $P_R$ are input to a turbo speed ($RPM_T$) module, which determines the estimated $RPM_T$ ($RPM_{TEST}$) using the compressor map. A multiplier module 624 corrects $RPM_{TEST}$ based on $k_{TEMP}$ to provide a corrected $RPM_{TEST}$ ($RPM_{TESTC}$). A difference module 626 determines $\Delta RPM$ based on $RPM_{ESTC}$ and $RPM_{TACT}$. A comparator module 628 compares $\Delta RPM$ to $\Delta RPM_{THR}$ and generates a signal based thereon. For example, if $\Delta RPM$ is less than $\Delta RPM_{THR}$, the comparator module 628 can generate a "0" signal indicating that the turbo speed sensor is deemed to be accurate for the low speed diagnostic. If $\Delta RPM$ is not less than $\Delta RPM_{THR}$, the comparator module 628 can generate a "1" signal indicating that the turbo speed sensor is deemed to be inaccurate for the low speed diagnostic. A high speed pass/fail module 630 generates a diagnostic signal based on the signal from the comparator module 628.

As an alternative to the embodiment illustrated in FIG. 6, it is anticipated that a high speed diagnostic range can be determined from the compressor map (i.e., from the $RPM_T$ module 622) based on $MAF_C$ and $P_R$. As described in detail above, a safety margin can be added to the upper and lower turbo speed values, which define this range, to provide a high speed diagnostic range for the turbo speed sensor. If $RPM_{TACT}$ is within the high speed diagnostic range, the turbo speed sensor is deemed to be accurate for the low speed diagnostic. $RPM_{TACT}$ is not within the high speed diagnostic range, the turbo speed sensor is deemed to be inaccurate for the low speed diagnostic.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A method of diagnosing operation of a turbo speed sensor that monitors a turbocharger in an internal combustion engine system, comprising:
   determining whether said engine system is operating in one of a first state and a second state, wherein said first state is idle operation of said engine system, and wherein said second state is an engine speed or an engine load greater than a corresponding threshold;
   determining a threshold turbo speed value based on whether said engine system is operating in one of said first state and said second state;
   monitoring an actual turbo speed value of said turbocharger based on a signal generated by said turbo speed sensor;
   comparing said actual turbo speed value to said threshold turbo speed value; and
   generating a diagnostic signal based on said comparing, wherein said diagnostic signal indicates a pass/fail status of said turbo speed sensor.

2. The method of claim 1 wherein said comparing includes:
   determining whether said actual turbo speed value is less than said threshold turbo speed value,
   wherein said diagnostic signal is a pass signal if said actual turbo speed value is less than said threshold turbo speed value and said diagnostic signal is a fail signal if said actual turbo speed value is greater than or equal to said threshold turbo speed value.

3. The method of claim 1 further comprising determining an estimated turbo speed value based on a pressure ratio and a mass air flow through said turbocharger, wherein said threshold turbo speed value is based on said estimated turbo speed value.

4. The method of claim 3 wherein determining said estimated turbo speed value includes implementing a compressor map that is specific to said turbocharger.

5. The method of claim 1 further comprising:
   determining a second threshold turbo speed value; and
   defining a diagnostic turbo speed range between said threshold turbo speed value and said second threshold turbo speed value,
   wherein said comparing includes determining whether said actual turbo speed value is within said diagnostic turbo speed range.

6. The method of claim 5 wherein said diagnostic signal is a pass signal if said actual turbo speed value is within said diagnostic turbo speed range and said diagnostic signal is a fail signal if said actual turbo speed value is not within said diagnostic turbo speed range.

7. The method of claim 1, further comprising determining whether said engine system is operating in said first state based on at least one of engine speed, throttle position, boost pressure, and engine coolant temperature.

8. The method of claim 1, further comprising:
   incrementing a counter based on said comparing; and
   generating said diagnostic signal when said counter is greater than a predetermined threshold.

9. A diagnostic system for monitoring operation of a turbo speed sensor for a turbocharger in an internal combustion engine system, comprising:
   a first module that determines whether said engine system is operating in one of a first state and a second state, wherein said first state is idle operation of said engine system, and wherein said second state is an engine speed or an engine load greater than a corresponding threshold;
   a second module that determines a threshold turbo speed value based on whether said engine system is operating in one of said first state and said second state;
   a third module that monitors an actual turbo speed value of said turbocharger based on a signal generated by said turbo speed sensor;
   a fourth module that compares said actual turbo speed value to said threshold turbo speed value; and
   a fifth module that generates a diagnostic signal based on an output of said fourth module, wherein said diagnostic signal indicates a pass/fail status of said turbo speed sensor.

10. The diagnostic system of claim 9 wherein said fourth module compares by determining whether said actual turbo speed value is less than said threshold turbo speed value, wherein said diagnostic signal is a pass signal if said actual turbo speed value is less than said threshold turbo speed value and said diagnostic signal is a fail signal if said actual turbo speed value is not less than said threshold turbo speed value.

11. The diagnostic system of claim 9 further comprising a sixth module that determines an estimated turbo speed value based on a pressure ratio and a mass air flow through said turbocharger, wherein said threshold turbo speed value is based on said estimated turbo speed value.

12. The diagnostic system of claim 11 wherein said sixth module determines said estimated turbo speed value by implementing a compressor map that is specific to said turbocharger.

13. The diagnostic system of claim 9 wherein said second module determines a second threshold turbo speed value and defines a diagnostic turbo speed range between said threshold turbo speed value and said second threshold turbo speed value, wherein said fourth module determines whether said actual turbo speed value is within said diagnostic turbo speed range.

14. The diagnostic system of claim 13 wherein said diagnostic signal is a pass signal if said actual turbo speed value is within said diagnostic turbo speed range and said diagnostic signal is a fail signal if said actual turbo speed value is not within said diagnostic turbo speed range.

15. The diagnostic system of claim 9, wherein said first module determines whether said engine system is operating in said first state based on at least one of engine speed, throttle position, boost pressure, and engine coolant temperature.

16. The diagnostic system of claim 9, wherein said fifth module (i) increments a counter based on said output of said fourth module, and (ii) generates said diagnostic signal when said counter is greater than a predetermined threshold.

17. A method of diagnosing operation of a turbo speed sensor that monitors a turbocharger in an internal combustion engine system, comprising:
   determining whether said engine system is operating in one of a high speed and a low speed range;
   determining a threshold turbo speed value, wherein said threshold turbo speed value is a predetermined turbo speed value if said engine system is operating in said low speed range, and wherein said threshold turbo speed value is based on a pressure ratio and a corrected mass air flow if said engine system is operating in said high speed range;
correcting said threshold turbo speed value based on a temperature correction factor if said engine system is operating in said high speed range;
monitoring an actual turbo speed value of said turbocharger based on a signal generated by said turbo speed sensor;
comparing said actual turbo speed value to said threshold turbo speed value; and
generating a diagnostic signal based on said comparing.

18. The method of claim 17 further comprising determining whether said engine system is operating in a steady state condition, wherein said comparing and generating are executed if said engine system is operating in said steady state condition.

19. The method of claim 17 wherein said comparing includes determining whether said actual turbo speed value is less than said threshold turbo speed value, wherein said diagnostic signal is a pass signal if said actual turbo speed value is less than said threshold turbo speed value and said diagnostic signal is a fail signal if said actual turbo speed value is not less than said threshold turbo speed value.

20. The method of claim 19 wherein said comparing is executed if an engine temperature is greater than a threshold engine temperature.

21. The method of claim 17 further comprising determining an estimated turbo speed value based on said pressure ratio and said corrected mass air flow through said turbocharger, wherein said threshold turbo speed value is based on said estimated turbo speed value.

22. The method of claim 21 wherein said determining an estimated turbo speed value includes implementing a compressor map that is specific to said turbocharger.

23. The method of claim 17 further comprising:
determining a second threshold turbo speed value; and
defining a diagnostic turbo speed range between said threshold turbo speed value and said second threshold turbo speed value,
wherein said comparing includes determining whether said actual turbo speed value is within said diagnostic turbo speed range.

24. The method of claim 23 wherein said diagnostic signal is a pass signal if said actual turbo speed value is within said diagnostic turbo speed range and said diagnostic signal is a fail signal if said actual turbo speed value is not within said diagnostic turbo speed range.

25. The method of claim 17 further comprising:
determining said temperature correction factor and a pressure correction factor; and
correcting a mass air flow based on said temperature correction factor and said pressure correction factor to provide said corrected mass air flow.

26. The method of claim 17, further comprising determining whether said engine system is operating in said low speed range based on at least one of engine speed, throttle position, boost pressure, and engine coolant temperature.

27. The method of claim 17, further comprising:
incrementing a counter based on said comparing; and
generating said diagnostic signal when said counter is greater than a predetermined threshold.

* * * * *